(12) United States Patent
Chen

(10) Patent No.: US 12,374,920 B2
(45) Date of Patent: Jul. 29, 2025

(54) WIRELESS CHARGING DEVICE

(71) Applicant: Primax Electronics Ltd., Taipei (TW)

(72) Inventor: Bo-An Chen, Taipei (TW)

(73) Assignee: Primax Electronics Ltd., Taipei (TW)

( * ) Notice: Subject to any disclaimer, the term of this patent is extended or adjusted under 35 U.S.C. 154(b) by 571 days.

(21) Appl. No.: 17/959,652

(22) Filed: Oct. 4, 2022

(65) Prior Publication Data
US 2024/0088708 A1    Mar. 14, 2024

(30) Foreign Application Priority Data

Sep. 12, 2022    (TW) .................................. 111134398

(51) Int. Cl.
*H02J 50/00*    (2016.01)
*H02J 50/10*    (2016.01)

(52) U.S. Cl.
CPC ............ *H02J 50/005* (2020.01); *H02J 50/10* (2016.02)

(58) Field of Classification Search
CPC ........ H02J 50/005; H02J 50/10; H02J 7/0042; H05K 7/20136; H05K 7/20145; H05K 7/20154; H05K 7/20181
USPC ........ 320/108; 307/104; 361/679.49, 679.51, 361/692, 695, 697, 714, 703
See application file for complete search history.

(56) References Cited

U.S. PATENT DOCUMENTS

| | | | |
|---|---|---|---|
| 6,455,186 B1* | 9/2002 | Moores, Jr. ......... | H01M 10/482 429/62 |
| 9,293,929 B2* | 3/2016 | Hong .................... | H02J 7/0042 |
| 9,451,723 B2* | 9/2016 | Lofy ................... | H05K 7/20845 |
| 9,867,237 B2* | 1/2018 | Matsui ................. | H05B 6/1263 |
| 11,134,584 B2* | 9/2021 | Pinkos ................. | H01F 27/025 |
| 11,243,583 B2* | 2/2022 | Lee ..................... | H05K 7/20418 |
| 11,310,934 B2* | 4/2022 | Los ........................ | H02J 50/12 |
| 11,419,238 B2* | 8/2022 | Sui ....................... | H01F 27/085 |
| 11,476,706 B2* | 10/2022 | Pinkos ................. | H02J 50/005 |
| 11,482,885 B2* | 10/2022 | Wechsler ............... | H02J 50/10 |
| 11,516,895 B2* | 11/2022 | Ettes ................... | H05B 6/1263 |
| 11,632,881 B2* | 4/2023 | Jeong ................. | H05K 7/20945 361/695 |

(Continued)

FOREIGN PATENT DOCUMENTS

| | | | | |
|---|---|---|---|---|
| CN | 209948705 U | * | 1/2020 | |
| CN | 112311033 A | * | 2/2021 | ......... H05K 7/20145 |

(Continued)

*Primary Examiner* — Jared Fureman
(74) *Attorney, Agent, or Firm* — KIRTON McCONKIE; Evan R. Witt

(57) ABSTRACT

A wireless charging device includes a device body, a covering member, a fan module and airflow adjustment element. The device body includes a top wall, a bottom wall and a first airflow outlet. The first airflow outlet is formed in the top wall. An airflow channel and a second airflow outlet are defined between the covering member and the device body. The second airflow outlet is located under the bottom wall. The fan module is installed within the covering member. The fan module has an air outlet, and the air outlet faces the airflow channel. The airflow adjustment element is installed on the bottom wall. An airflow from the fan module is split into a first-portion airflow and a second-portion airflow by the airflow adjustment element. The first-portion airflow flows out of the first airflow outlet. The second-portion airflow flows out of the second airflow outlet.

9 Claims, 4 Drawing Sheets

(56) References Cited

U.S. PATENT DOCUMENTS

| | | | | |
|---|---|---|---|---|
| 11,811,239 B2* | 11/2023 | Cook | | H05K 7/20136 |
| 11,848,565 B2* | 12/2023 | Powell, Jr. | | H02J 50/005 |
| 2019/0014683 A1* | 1/2019 | Han | | H02J 50/10 |
| 2021/0391734 A1* | 12/2021 | Selby | | H02J 7/00309 |
| 2022/0256732 A1* | 8/2022 | Wu | | H02J 7/0044 |
| 2022/0377947 A1* | 11/2022 | Goodchild | | H01F 38/14 |
| 2023/0074238 A1* | 3/2023 | Seth | | H05K 7/20145 |
| 2023/0074957 A1* | 3/2023 | Zou | | H01F 38/14 |
| 2023/0253808 A1* | 8/2023 | Snyder | | H01M 10/6563 |
| | | | | 320/113 |

FOREIGN PATENT DOCUMENTS

| | | | | | |
|---|---|---|---|---|---|
| CN | 113036826 A | * | 6/2021 | | H02J 7/0042 |
| CN | 113258622 A | * | 8/2021 | | H05K 7/20136 |
| CN | 113597233 A | * | 11/2021 | | H05K 7/2039 |
| CN | 118868434 A | * | 10/2024 | | H02J 7/0042 |
| EP | 3349555 A1 | * | 7/2018 | | H05K 7/20145 |
| EP | 3852224 B1 | * | 6/2022 | | H02J 50/10 |
| KR | 20180078789 A | * | 7/2018 | | H02J 50/10 |
| KR | 20180078794 A | * | 7/2018 | | H05K 7/20145 |
| WO | WO-2019121530 A1 | * | 6/2019 | | B60L 53/12 |
| WO | WO-2021238847 A1 | * | 12/2021 | | H02J 50/10 |

\* cited by examiner

WIRELESS CHARGING DEVICE

FIELD OF THE INVENTION

The present invention relates to a charging device for charging a to-be-charged electronic device, and more particularly to a wireless charging device.

BACKGROUND OF THE INVENTION

In modern societies, portable electronic devices (e.g., smart phones) have become indispensable parts in human lives. The portable electronic devices are applied in many sectors, including food, clothing, housing, transportation, education and entertainment. Generally, the portable electronic device is powered by a built-in battery. When the electricity quantity of the battery is insufficient, it is necessary to charge the battery of the portable electronic device. Consequently, the portable electronic device can be continuously operated.

Nowadays, portable electronic devices can be charged by using a wired charging technology or a wireless charging technology. With the advancement of the wireless charging technology, a wireless charging module has gradually become one of the standard equipment of the portable electronic devices. For wirelessly charging a portable electronic device, the portable electronic device is firstly placed on a wireless charging device. Then, a transmitter coil in the wireless charging device is enabled to emit an electromagnetic field. When a receiver coil in the portable electronic device senses the electromagnetic field, a charging current is generated according to the change of the magnetic fluxes. Consequently, the portable electronic device is charged by the charging current.

Generally, the charging efficiency of the wireless charging device is closely related to the working temperature of the wireless charging device. In case that the working temperature of the wireless charging device is too high, the wireless charging efficiency will be deteriorated or a self-protection program in the circuit board of the wireless charging device will be activated. Under this circumstance, the charging process cannot be continuously performed, or some other problems will occur. Consequently, the time period of charging the to-be-charged electronic device increases, or the to-be-charged electronic device is unable to acquire the electric energy continuously.

Conventionally, the output power of the wireless charging devices is low. Since the generated heat in the charging process is not very high, the use of natural convection to dissipate away the generated heat is sufficient. However, with the increasing output power of the wireless charging device, the generated heat in the charging process gradually increases. As a consequence, an additional heat dissipation mechanism is required.

Therefore, there is a need of providing a wireless charging device with enhanced heat dissipation efficiency in order to overcome the drawbacks of the conventional technologies.

SUMMARY OF THE INVENTION

An object of the present invention provides a wireless charging device. The wireless charging device includes a device body, a fan module and an airflow adjustment element. The airflow produced by the fan module is adjusted by the airflow adjustment element. Since the airflow is transferred through a large area of the device body, the heat dissipation efficiency is enhanced.

The other objects and advantages of the present invention will be understood from the disclosed technical features.

In accordance with an aspect of the present invention, a wireless charging device is provided. The wireless charging device includes a device body, a covering member, a fan module and airflow adjustment element. The device body includes a top wall, a bottom wall and a first airflow outlet. The top wall and the bottom wall are opposed to each other. The first airflow outlet is formed in the top wall. The covering member is installed on the device body. An airflow channel and a second airflow outlet are defined between the covering member and the device body. The airflow channel is in communication with the first airflow outlet and the second airflow outlet. The second airflow outlet is located under the bottom wall of the device body. The fan module is installed within the covering member. The fan module has an air outlet, and the air outlet faces the airflow channel. The airflow adjustment element is installed on the bottom wall of the device body and disposed within the airflow channel. The airflow adjustment element is extended in a direction toward the air outlet of the fan module. The airflow adjustment element is aligned with the air outlet of the fan module. When an airflow produced by the fan module is blown out from the air outlet, the airflow is split into a first-portion airflow and a second-portion airflow by the airflow adjustment element. A flowing direction of the first-portion airflow and a flowing direction of the second-portion airflow are different. The first-portion airflow flows out of the first airflow outlet. The second-portion airflow flows out of the second airflow outlet.

In an embodiment, the airflow adjustment element has an internal concave surface and an external convex surface. The internal concave surface is located at a first side of the airflow adjustment element close to the device body. The external convex surface is located at a second side of the airflow adjustment element away from the device body. The device body further includes a flow-guiding lateral wall. The flow-guiding lateral wall is connected between the top wall and the bottom wall and aligned with the first airflow outlet. The covering member has an inner surface. A first sub-channel of the airflow channel is defined by the external convex surface of the airflow adjustment element. The inner surface of the covering member and the flow-guiding lateral wall of the device body collaboratively. The first sub-channel is in communication with the first airflow outlet. The first-portion airflow flows along the first sub-channel and flows out of the first airflow outlet.

In an embodiment, the fan module has a top surface corresponding to the bottom wall of the device body. A second sub-channel of the airflow channel is defined by the internal concave surface of the airflow adjustment element, the top surface of the fan module and the bottom wall of the device body collaboratively, wherein the second sub-channel is in communication with the second airflow outlet, and the second-portion airflow flows along the second sub-channel and flows out of the second airflow outlet.

In an embodiment, the wireless charging device further includes plural flow-guiding plates. The plural flow-guiding plates are installed on the inner surface of the covering member and disposed within the first sub-channel. Moreover, one flow-guiding channel is defined by every two adjacent flow-guiding plates of the plural flow-guiding plates, so that plural flow-guiding channels are defined by the plural flow-guiding plates. While the first-portion airflow flows along the first sub-channel and flows out of the first airflow outlet, the first-portion airflow flows through the plural flow-guiding channels.

In an embodiment, the wireless charging device further includes plural fins. The plural fins are installed on the bottom wall of the device body, and the plural fins are located beside the covering member, wherein after the second-portion airflow flows out of the second airflow outlet, the second-portion airflow flows through the plural fins.

In an embodiment, the wireless charging device further includes plural guiding grooves, and the plural guiding grooves are formed in the top wall of the device body. When a to-be-charged electronic device is placed on the top wall of the device body, plural heat dissipation channels are formed between the to-be-charged electronic device and the plural guiding grooves. After the first-portion airflow flows out of the first airflow outlet, the first-portion airflow flows through the plural heat dissipation channels.

In an embodiment, the airflow adjustment element is aligned with the air outlet of the fan module. Consequently, the air outlet of the fan module is divided into a first outlet portion and a second outlet portion by the airflow adjustment element. A diameter of the second outlet portion is larger than a diameter of the first outlet portion.

In an embodiment, the wireless charging device further includes a transmitter coil unit and a circuit board. The transmitter coil unit and the circuit board are disposed within the device body.

In an embodiment, the wireless charging device further includes a power input port. The power input port is disposed within the device body. Moreover, a portion of the power input port is exposed outside the device body.

From the above descriptions, the present invention provides the wireless charging device. The wireless charging device is equipped with the airflow adjustment element corresponding to the air outlet of the fan module. When the airflow produced by the fan module is blown out from the air outlet, the airflow is split into at least two portions by the airflow adjustment element. Moreover, different portions of the airflow are blown to different sub-channels of the airflow channel according to the settings. Consequently, the airflow can be transferred through a large area of the device body, and the heat in the path of the airflow can be effectively dissipated to the surroundings. Due to this structural design, the heat dissipation efficiency of the device body is largely enhanced, and the heat of the to-be-charged electronic device placed on the device body is also dissipated. Since the temperature of the wireless charging device is not obviously increased, the charging efficiency is not adversely affected.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
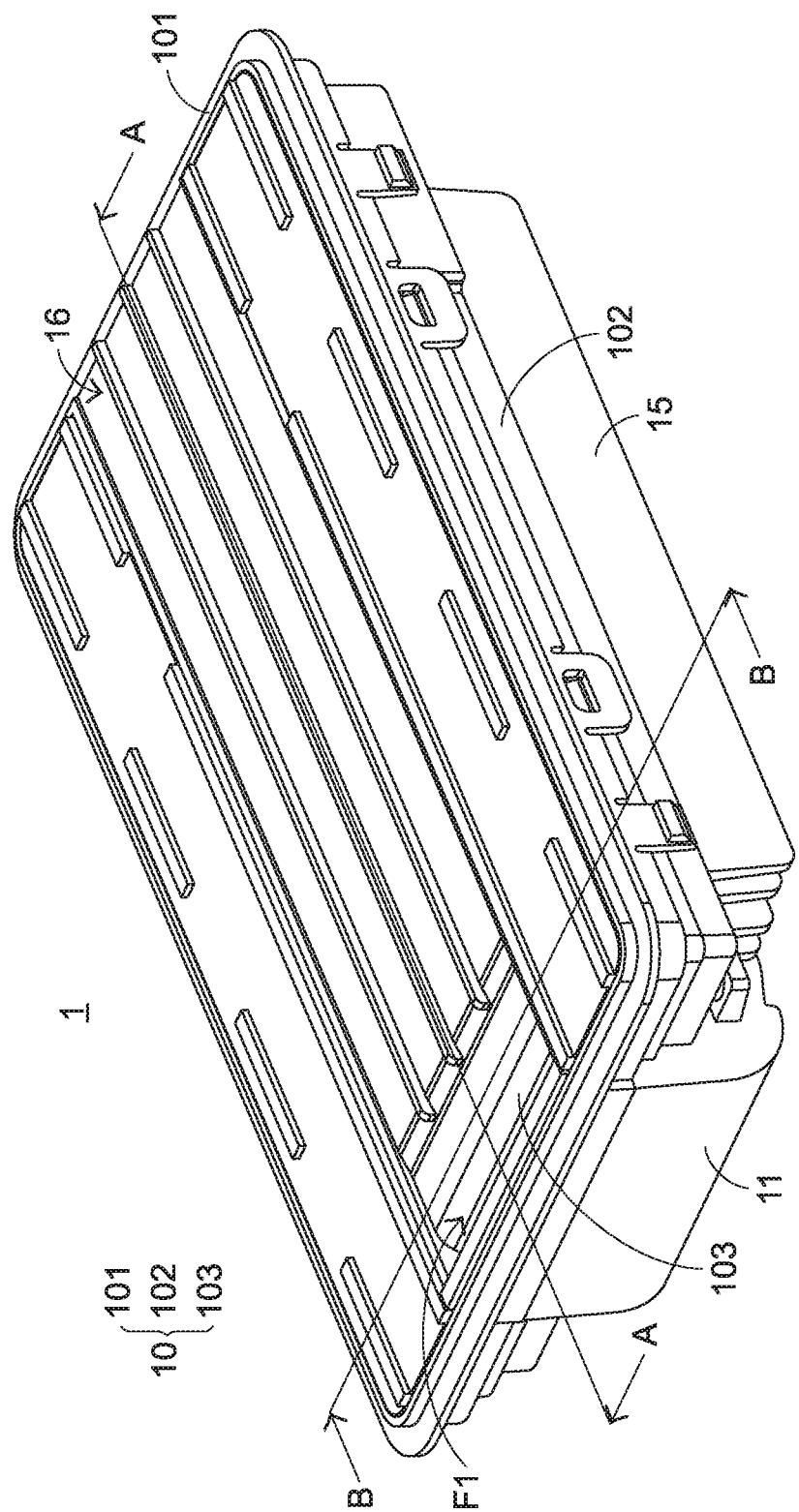
FIG. 1 is a schematic perspective view illustrating the appearance of a wireless charging device according to an embodiment of the present invention.
Figure 2:
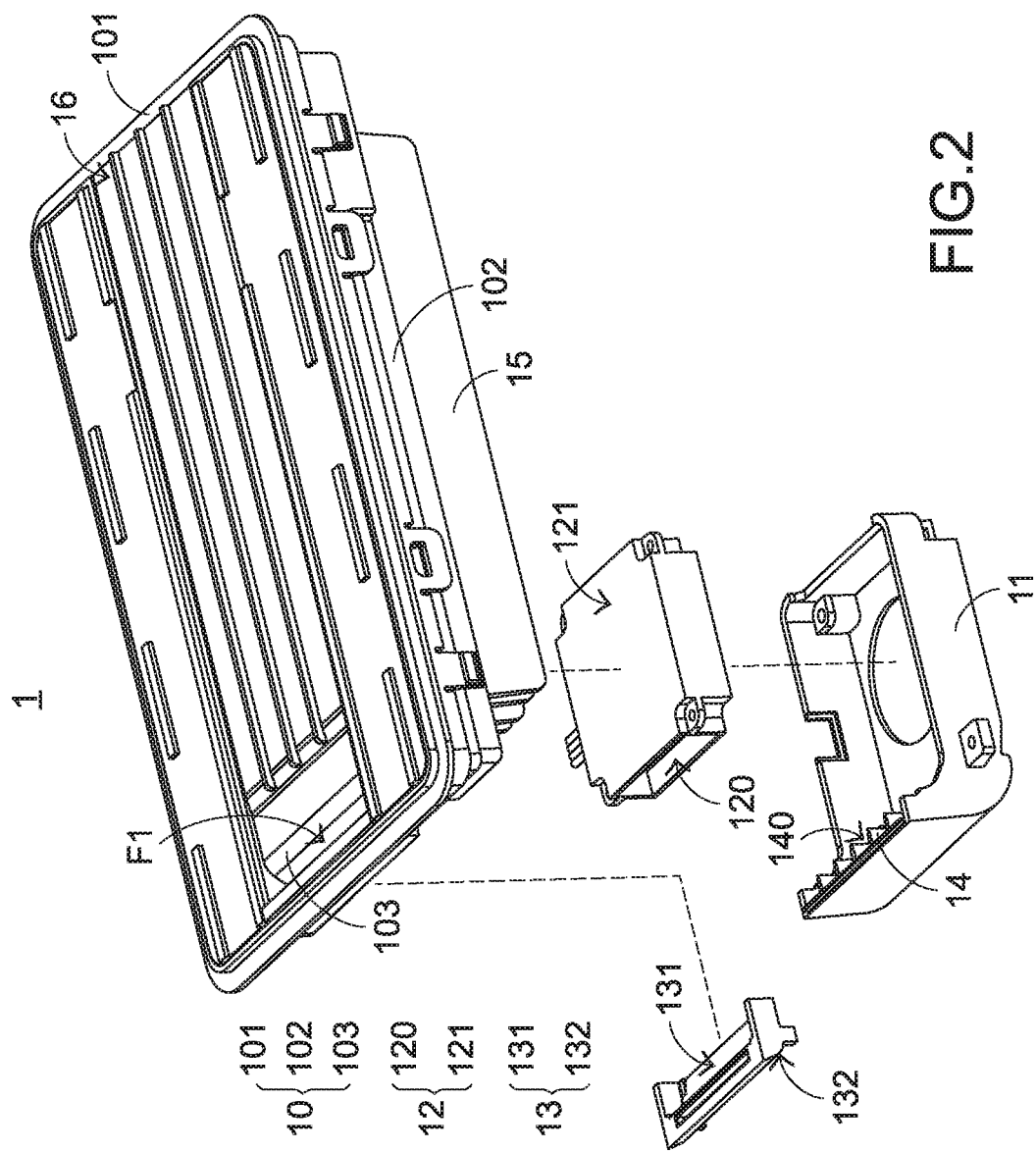
FIG. 2 is a schematic exploded view illustrating the components of the wireless charging device as shown in FIG. 1.
Figure 3:
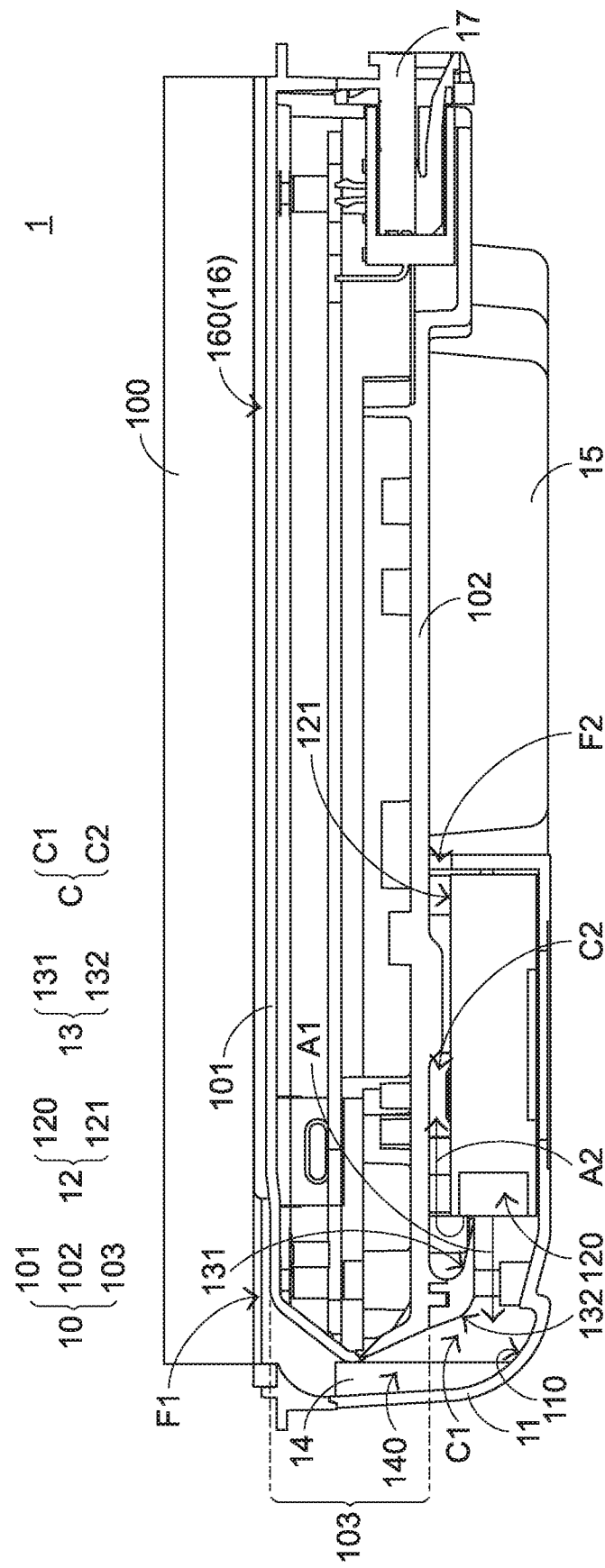
FIG. 3 is a schematic cross-sectional view illustrating the and taken along a viewpoint as shown in FIG. 1 and taken along a line AA.
Figure 4:
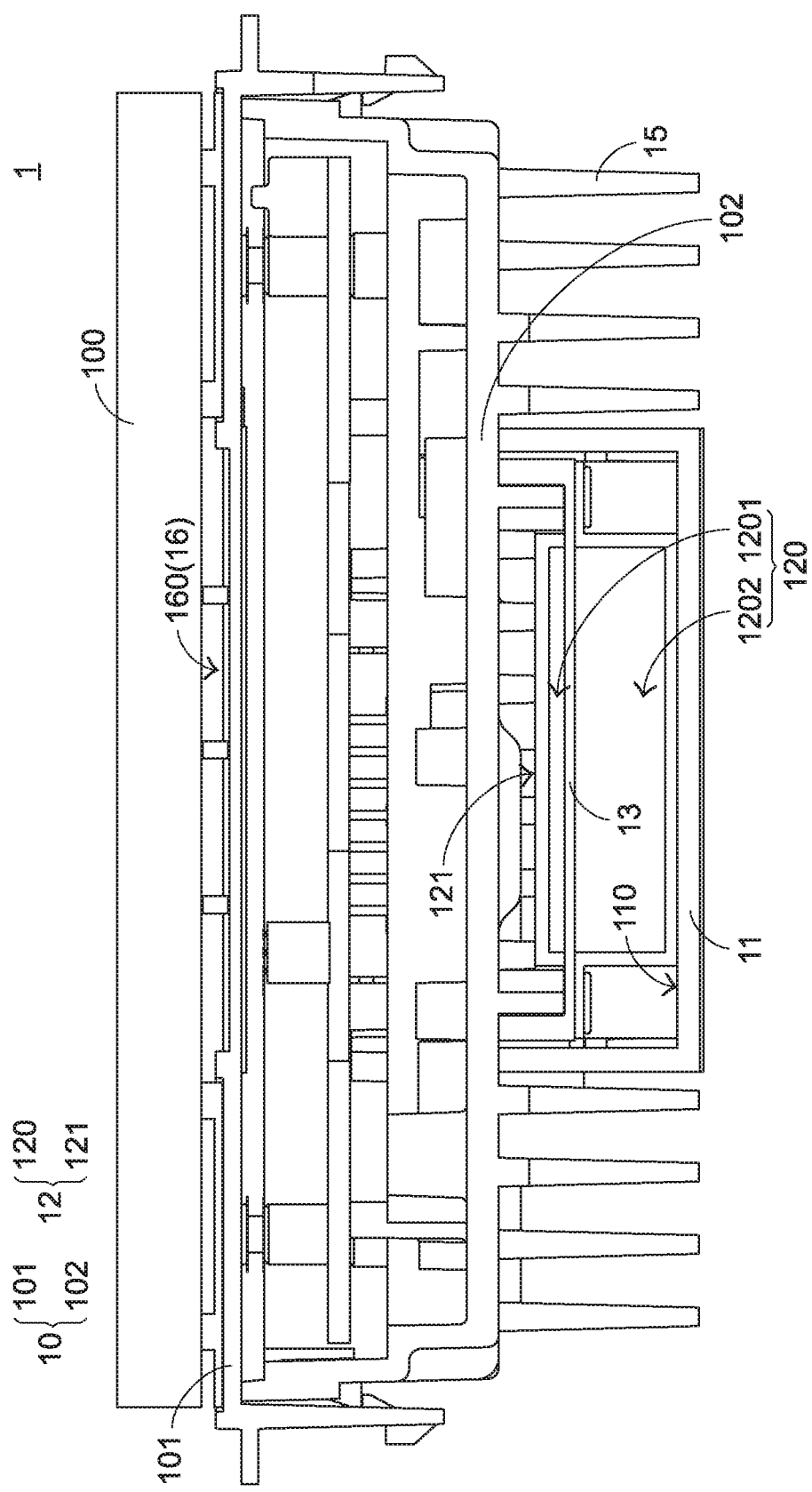
FIG. 4 is a schematic cross-sectional view illustrating the wireless charging device as shown in FIG. 1 and taken along a line BB.

Please refer to FIGS. 1 to 4. FIG. 1 is a schematic perspective view illustrating the appearance of a wireless charging device according to an embodiment of the present invention. FIG. 2 is a schematic exploded view illustrating the components of the wireless charging device as shown in FIG. 1. FIG. 3 is a schematic cross-sectional view illustrating the and taken along a viewpoint as shown in FIG. 1 and taken along a line AA. FIG. 4 is a schematic cross-sectional view illustrating the wireless charging device as shown in FIG. 1 and taken along a line BB.

As shown in FIGS. 1, 2, 3 and 4, the wireless charging device 1 of this embodiment, comprises a device body 10, a covering member 11, a fan module 12 and an airflow adjustment element 13.

The device body 10 comprises a top wall 101, a bottom wall 102 and a first airflow outlet F1. The top wall 101 and the bottom wall 102 are opposed to each other. The first airflow outlet F1 is formed in the top wall 101 of the device body 10. The covering member 11 is installed on the device body 10. When the covering member 11 and the device body 10 are assembled with each other, an airflow channel C and a second airflow outlet F2 are defined between the covering member 11 and the device body 10. The airflow channel C is in communication with the first airflow outlet F 1 and the second airflow outlet F2. The second airflow outlet F2 is located under the bottom wall 102 of the device body 10. The fan module 12 is disposed within the covering member 11. The fan module 12 has an air outlet 120. The air outlet 120 faces the airflow channel C. The airflow adjustment element 13 is installed on the bottom wall 102 of the device body 10 and disposed within the airflow channel C. The airflow adjustment element 13 is extended in the direction toward the air outlet 120 of the fan module 12. Moreover, the airflow adjustment element 13 is aligned with the air outlet 120 of the fan module 12.

When an airflow produced by the fan module 12 is blown out from the air outlet 120, the airflow is immediately introduced into the airflow adjustment element 13. By the airflow adjustment element 13, the airflow is split into a first-portion airflow A1 and a second-portion airflow A2. The flowing direction of the first-portion airflow A1 and the flowing direction of the second-portion airflow A2 are different. The first-portion airflow A1 is exhausted to the surroundings through the first airflow outlet F1 in the top wall 101 of the device body 10. The second-portion airflow A2 is exhausted to the surroundings through the second airflow outlet F2 under the bottom wall 102 of the device body 10.

In the above embodiment, the airflow is split into two portions (i.e., the first-portion airflow A1 and the second-portion airflow A2) by the airflow adjustment element 13. It is noted that numerous modifications and alterations may be made while retaining the teachings of the invention. For example, the shape of the airflow adjustment element 13 can be properly changed according to the practical requirements, and thus the airflow can be split into more than two portions.

The other structure of the wireless charging device 1 will be described in more details as follows.

Please refer to FIGS. 1, 2, 3 and 4 again. In an embodiment, the airflow adjustment element 13 has an internal concave surface 131 and an external convex surface 132. The internal concave surface 131 is located at a first side of the airflow adjustment element 13 close to the device body 10. The external convex surface 132 is located at a second side of the airflow adjustment element 13 away from the device body 10. After the airflow produced by the fan module 12 is split into the first-portion airflow A1 and the second-portion airflow A2 by the airflow adjustment element 13, the second-portion airflow A2 flows along the internal concave surface 131 of the airflow adjustment element 13. Consequently, the flowing direction of the second-portion airflow A2 is changed. Originally, the second-portion airflow A2 flows in the direction away from the second airflow outlet F2. Since the flowing direction of the second-portion airflow A2 is changed by the internal concave surface 131 of the airflow adjustment element 13, the second-portion airflow A2 flows in the direction toward the second airflow outlet F2.

Please refer to FIGS. 1, 2, 3 and 4 again. In an embodiment, the device body 10 further comprises a flow-guiding lateral wall 103. The flow-guiding lateral wall 103 is connected between the top wall 101 and the bottom wall 102. Moreover, the flow-guiding lateral wall 103 is aligned with the first airflow outlet F1. In an embodiment, the covering member 11 has an inner surface 110. Moreover, a first sub-channel C1 of the airflow channel C is defined by the external convex surface 132 of the airflow adjustment element 13, the inner surface 110 of the covering member 11 and the flow-guiding lateral wall 103 of the device body 10 collaboratively. The first sub-channel C1 of the airflow channel C is in communication with the first airflow outlet F1 in the top wall 101 of the device body 10. The first-portion airflow A1 can be guided by the first sub-channel C1. Consequently, the first-portion airflow A1 flows along the first sub-channel C1 and flows out of the first airflow outlet F1.

Please refer to FIGS. 1, 2, 3 and 4 again. In an embodiment, the fan module 12 has a top surface 121 corresponding to the bottom wall 102 of the device body 10. Moreover, a second sub-channel C2 of the airflow channel C is defined by the internal concave surface 131 of the airflow adjustment element 13, the bottom wall 102 of the device body 10 and the top surface 121 of the fan module 12 collaboratively. The second sub-channel C2 of the airflow channel C is in communication with the second airflow outlet F2 under the bottom wall 102 of the device body 10. The second-portion airflow A2 can be guided by the second sub-channel C2. Consequently, the second-portion airflow A2 flows along the second sub-channel C2 and flows out of the second airflow outlet F2.

Since the airflow adjustment element 13 is aligned with the air outlet 120 of the fan module 12, the air outlet 120 of the fan module 12 is divided into a first outlet portion 1201 and a second outlet portion 1202 by the airflow adjustment element 13. In this embodiment, the diameter of the second outlet portion 1202 is larger than the diameter of the first outlet portion 1201. Consequently, after the airflow produced by the fan module 12 is split into the first-portion airflow A1 and the second-portion airflow A2 by the airflow adjustment element 13, the first-portion airflow A1 flows out of the first outlet portion 1201, and the second-portion airflow A2 flows out of the second outlet portion 1202. Since the diameter of the first outlet portion 1201 is smaller, the first-portion airflow A1 may be considered as a side stream wind. Since the diameter of the second outlet portion 1202 is larger, the second-portion airflow A2 may be considered as a mainstream wind.

In the above embodiment, the diameter of the second outlet portion 1202 is larger than the diameter of the first outlet portion 1201. It is noted that numerous modifications and alterations may be made while retaining the teachings of the invention. For example, in another embodiment, the diameter of the first outlet portion 1201 is larger than the diameter of the second outlet portion 1202. Alternatively, the diameter of the air outlet 120 of the fan module 12 is selectively increased or decreased according to the practical requirements. For example, in case that the diameter of the air outlet 120 of the fan module 12 is increased, the first outlet portion 1201 and the second outlet portion 1202 divided by the airflow adjustment element 13 are both enlarged. Consequently, the output amount of the first-portion airflow A1 from the first outlet portion 1201 and the output amount of the second-portion airflow A2 from the second outlet portion 1202 are increased.

Please refer to FIGS. 1, 2, 3 and 4 again. In an embodiment, the wireless charging device 1 further comprises plural flow-guiding plates 14. These flow-guiding plates 14 are installed on the inner surface 110 of the covering member 11 and disposed within the first sub-channel C1 of the airflow channel C. Moreover, a flow-guiding channel 140 is defined by every two adjacent flow-guiding plates 14 of the plural flow-guiding plates 14. In other words, plural flow-guiding channels 140 are defined by the plural flow-guiding plates 14. While the first-portion airflow A1 flows along the first sub-channel C1 and flows out of the first airflow outlet F1, the first-portion airflow A1 flows through the flow-guiding channels 140, which are defined by the plural flow-guiding plates 14.

Please refer to FIGS. 1, 2, 3 and 4 again. In an embodiment, the wireless charging device 1 further comprises plural fins 15. The plural fins 15 are installed on the bottom wall 102 of the device body 10. The plural fins 15 are located beside the covering member 11. After the second-portion airflow A2 flows along the second sub-channel C2 and flows out of the second airflow outlet F2, the second-portion airflow A2 is directly blown to the plural fins 15. Consequently, the heat exchange between the second-portion airflow A2 and the fins 15 is carried out. In this way, the heat generated by the device body 10 can be guided to the surroundings more quickly.

Please refer to FIGS. 1, 2, 3 and 4 again. In an embodiment, the wireless charging device 1 further comprises plural guiding grooves 16. The plural guiding grooves 16 are formed in the top wall 101 of the device body 10. When a to-be-charged electronic device 100 is placed on the top wall 101 of the device body 10, plural heat dissipation channels 160 are formed between the to-be-charged electronic device 100 and the plural guiding grooves 16. After the first-portion airflow A1 flows along the first sub-channel C1 and flows out of the first airflow outlet F1, the first-portion airflow A1 flows through the plural heat dissipation channels 160. Consequently, the heat exchange between the first-portion airflow A1 and the to-be-charged electronic device 100 and the heat exchange between the first-portion airflow A1 and the device body 10 of the wireless charging device 1 are carried out. In this way, the heat generated in the region between the to-be-charged electronic device 100 and the device body 10 can be exhausted to the surroundings more quickly.

As shown in FIG. 3, the wireless charging device 1 further comprises a power input port 17. The power input port 17 is disposed within the device body 10. Moreover, the power input port 17 is extended externally from a lateral wall of the device body 10 that is opposed to the flow-guiding lateral wall 103. Consequently, a portion of the power input port 17 is exposed outside the device body 10. For example, the power input port 17 is a USB socket or a MINI USB socket. A power cable (not shown) with a USB plug or a MINI USB plug can be connected with the power input port 17. The wireless charging device 1 is coupled with an external power source (not shown) through the power cable. It is noted that the type and the specification of the power input port 17 in the wireless charging device 1 of the present invention are not restricted.

Please refer to FIGS. 1, 2, 3 and 4 again. In an embodiment, the wireless charging device 1 further comprises a transmitter coil unit (not shown) and a circuit board (not shown). The transmitter coil unit and the circuit board are disposed within the device body 10. When the to-be-charged electronic device 100 is placed on the top wall 101 of the device body 10, the be-charged electronic device 100 is wirelessly charged by the device body 10. During the operation of the wireless charging device 1, the transmitter coil unit emits an electromagnetic field. When a built-in receiver coil of the to-be-charged electronic device 100 senses the electromagnetic field, a charging current is generated according to the change of the magnetic fluxes. Consequently, the to-be-charged electronic device 100 is charged by the charging current. The principles of wirelessly charging the to-be-charged electronic device 100 by the wireless charging device 1 are well known to those skilled in the art, and not redundantly described herein.

From the above descriptions, the present invention provides the wireless charging device. The wireless charging device is equipped with the airflow adjustment element corresponding to the air outlet of the fan module. When the airflow produced by the fan module is blown out from the air outlet, the airflow is split into at least two portions by the airflow adjustment element. Moreover, different portions of the airflow are blown to different sub-channels of the airflow channel according to the settings. Consequently, the airflow can be transferred through a large area of the device body, and the heat in the path of the airflow can be effectively dissipated to the surroundings. Due to this structural design, the heat dissipation efficiency of the device body is largely enhanced, and the heat of the to-be-charged electronic device placed on the device body is also dissipated. Since the temperature of the wireless charging device is not obviously increased, the charging efficiency is not adversely affected.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A wireless charging device, comprising:
a device body comprising a top wall, a bottom wall and a first airflow outlet, wherein the top wall and the bottom wall are opposed to each other, and the first airflow outlet is formed in the top wall;
a covering member installed on the device body, wherein an airflow channel and a second airflow outlet are defined between the covering member and the device body, wherein the airflow channel is in communication with the first airflow outlet and the second airflow outlet, and the second airflow outlet is located under the bottom wall of the device body;
a fan module installed within the covering member, wherein the fan module has an air outlet, and the air outlet faces the airflow channel; and
an airflow adjustment element installed on the bottom wall of the device body and disposed within the airflow channel, wherein the airflow adjustment element is extended in a direction toward the air outlet of the fan module, and the airflow adjustment element is aligned with the air outlet of the fan module, wherein when an airflow produced by the fan module is blown out from the air outlet, the airflow is split into a first-portion airflow and a second-portion airflow by the airflow adjustment element, wherein a flowing direction of the first-portion airflow and a flowing direction of the second-portion airflow are different, the first-portion airflow flows out of the first airflow outlet, and the second-portion airflow flows out of the second airflow outlet.

2. The wireless charging device according to claim 1, wherein the airflow adjustment element has an internal concave surface and an external convex surface, wherein the internal concave surface is located at a first side of the airflow adjustment element close to the device body, and the external convex surface is located at a second side of the airflow adjustment element away from the device body, wherein the device body further comprises a flow-guiding lateral wall, and the flow-guiding lateral wall is connected between the top wall and the bottom wall and aligned with the first airflow outlet, wherein the covering member has an inner surface, and a first sub-channel of the airflow channel is defined by the external convex surface of the airflow adjustment element, the inner surface of the covering member and the flow-guiding lateral wall of the device body collaboratively, wherein the first sub-channel is in communication with the first airflow outlet, and the first-portion airflow flows along the first sub-channel and flows out of the first airflow outlet.

3. The wireless charging device according to claim 2, wherein the fan module has a top surface corresponding to the bottom wall of the device body, and a second sub-channel of the airflow channel is defined by the internal concave surface of the airflow adjustment element, the top surface of the fan module and the bottom wall of the device body collaboratively, wherein the second sub-channel is in communication with the second airflow outlet, and the second-portion airflow flows along the second sub-channel and flows out of the second airflow outlet.

4. The wireless charging device according to claim 2, wherein the wireless charging device further comprises plural flow-guiding plates, wherein the plural flow-guiding plates are installed on the inner surface of the covering member and disposed within the first sub-channel, and one flow-guiding channel is defined by every two adjacent flow-guiding plates of the plural flow-guiding plates, so that plural flow-guiding channels are defined by the plural flow-guiding plates, wherein while the first-portion airflow flows along the first sub-channel and flows out of the first airflow outlet, the first-portion airflow flows through the plural flow-guiding channels.

5. The wireless charging device according to claim 1, wherein the wireless charging device further comprises plural fins, wherein the plural fins are installed on the bottom wall of the device body, and the plural fins are located beside the covering member, wherein after the second-portion airflow flows out of the second airflow outlet, the second-portion airflow flows through the plural fins.

6. The wireless charging device according to claim 1, wherein the wireless charging device further comprises plural guiding grooves, and the plural guiding grooves are formed in the top wall of the device body, wherein when a to-be-charged electronic device is placed on the top wall of the device body, plural heat dissipation channels are formed between the to-be-charged electronic device and the plural guiding grooves, wherein after the first-portion airflow flows out of the first airflow outlet, the first-portion airflow flows through the plural heat dissipation channels.

7. The wireless charging device according to claim 1, wherein the airflow adjustment element is aligned with the air outlet of the fan module, so that the air outlet of the fan module is divided into a first outlet portion and a second outlet portion by the airflow adjustment element, wherein a diameter of the second outlet portion is larger than a diameter of the first outlet portion.

8. The wireless charging device according to claim 1, wherein the wireless charging device further comprises a transmitter coil unit and a circuit board, wherein the transmitter coil unit and the circuit board are disposed within the device body.

9. The wireless charging device according to claim 1, wherein the wireless charging device further comprises a power input port, wherein the power input port is disposed within the device body, and a portion of the power input port is exposed outside the device body.

\* \* \* \* \*